Jan. 9, 1940. I. TORNBERG Re. 21,319

PRINTING PRESS

Original Filed Dec. 4, 1934 3 Sheets-Sheet 1

Inventor
Isidor Tornberg
By Attorneys.
Sam Hoadley Fay & Harding

Jan. 9, 1940. I. TORNBERG Re. 21,319
PRINTING PRESS
Original Filed Dec. 4, 1934 3 Sheets-Sheet 2
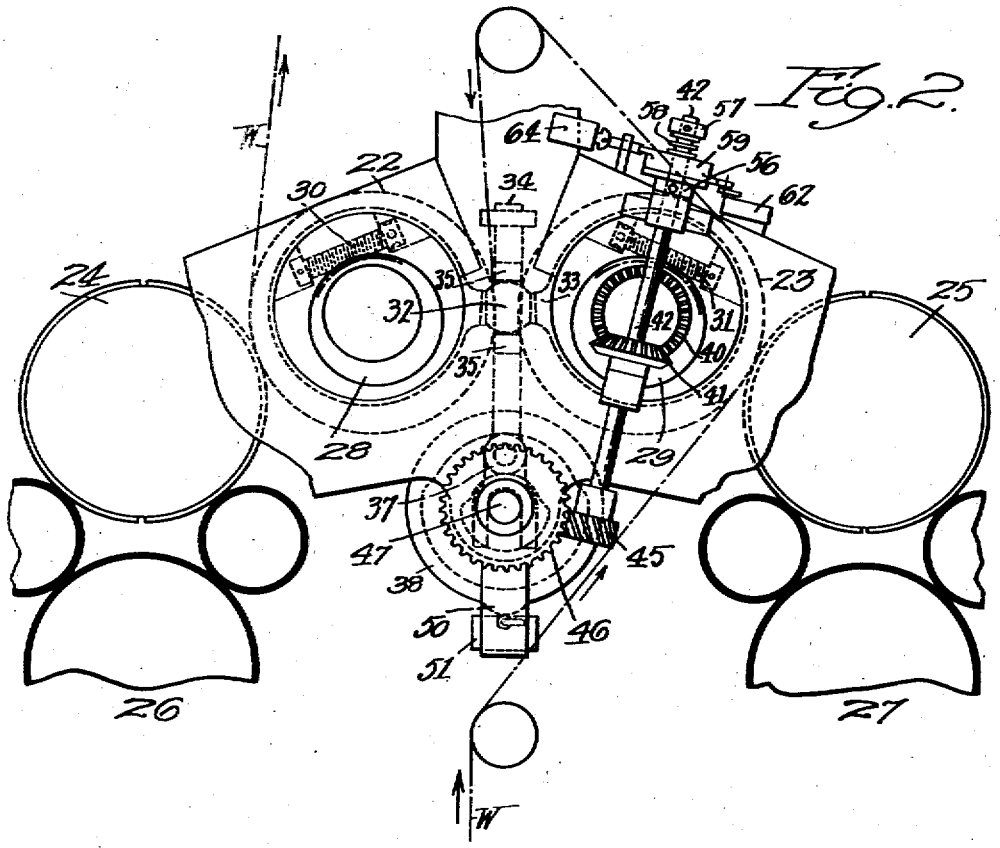
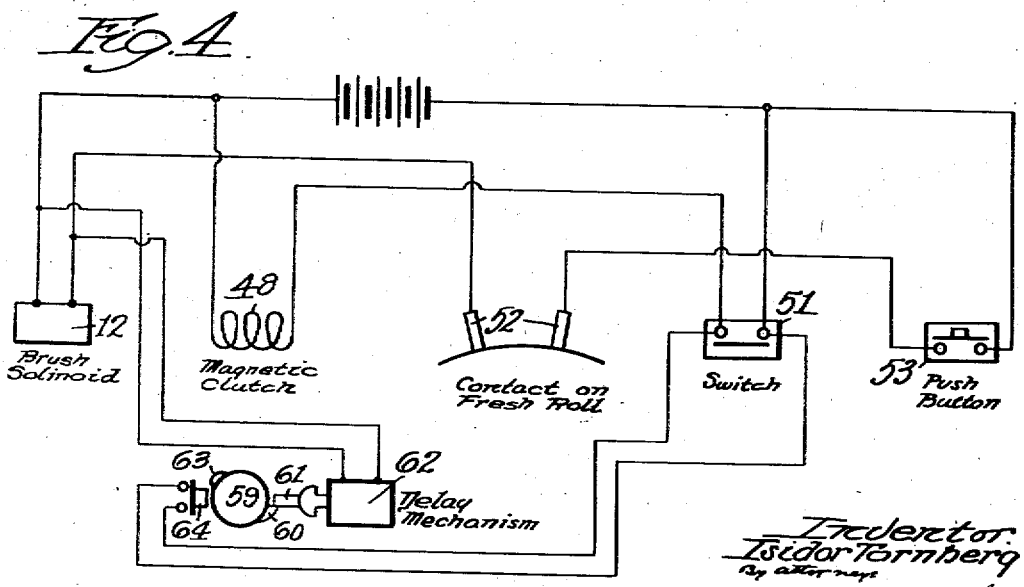
Inventor
Isidor Tornberg
By attorneys
Southgate Fay & Hanley Jan. 9, 1940. I. TORNBERG Re. 21,319

PRINTING PRESS

Original Filed Dec. 4, 1934 3 Sheets-Sheet 3

Inventor:
Isidor Tornberg.
By attorneys.
Southgate Fay & Hartley

Reissued Jan. 9, 1940

Re. 21,319

UNITED STATES PATENT OFFICE 21,319

PRINTING PRESS

Isidor Tornberg, Plainfield, N. J., assignor to Wood Newspaper Machinery Corporation, New York, N. Y., a corporation of Virginia Original No. 2,096,869, dated October 26, 1937, Serial No. 755,855, December 4, 1934. Application for reissue August 31, 1939, Serial No. 292,966

18 Claims. (Cl. 101—247)

This invention relates to the obviation of the difficulty encountered in splicing a web roll, due to the fact that the leading end of the new web and the following end of the old web have to pass through the printing couple together on account of the splice, this double thickness of web being detrimental to the type and blankets.

The principal object of the invention, therefore, is to provide for obviating this difficulty, particularly when hard packing is used. The invention also involves a convenient and inexpensive mechanism for releasing the impression squeeze or pressure when the double web passes through and the provision of automatic means for operating the releasing means controlled by the pasting mechanism so that the release will take place at the proper time.

Other objects and advantages of the invention will appear hereinafter.

Reference is to be had to the accompanying drawings, in which

Fig. 2 is an enlarged view of the press showing the releasing means;

Fig. 4 is a diagrammatic wiring diagram;

Figure 1:
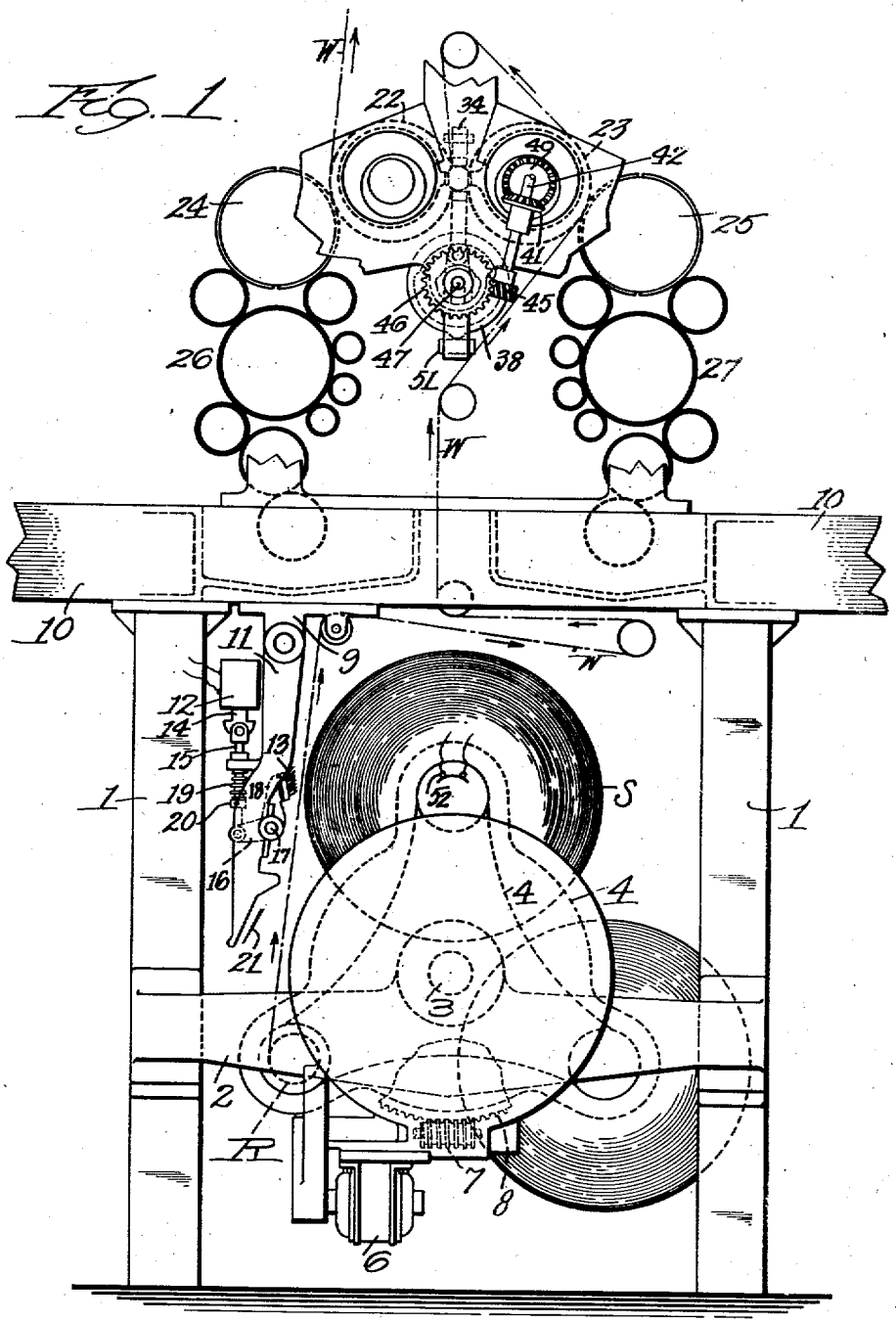
Fig. 1 is a diagrammatic end elevation of a printing press showing an ordinary web supply means and an ordinary splicing device.
Figure 3:
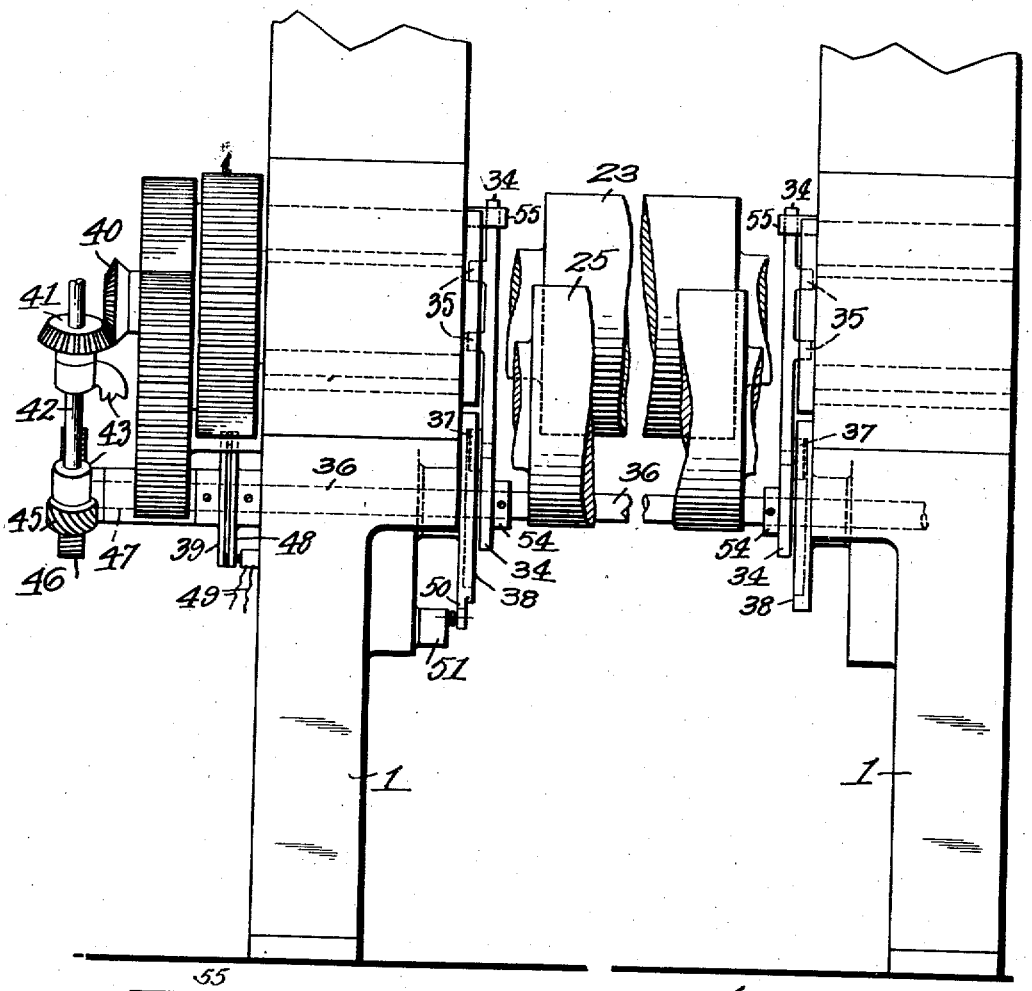
Fig. 3 is an elevation of a printing unit showing the releasing means or impression throw-off device.
Figure 5:
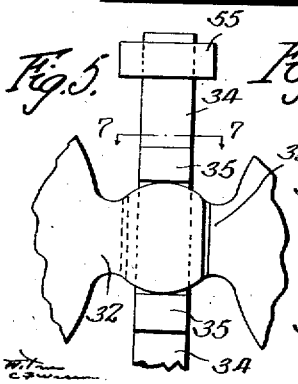
Fig. 5 is an enlarged elevation of certain parts shown in Fig. 2.
Figure 6:
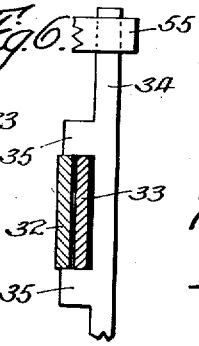
Fig. 6 is an edge view of the same, with parts in section.
Figure 7:
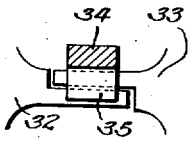
Fig. 7 is a sectional view on the line 7—7 of Fig. 5.

The use of hard packing on an impression cylinder, combined with the employment of automatic machinery for splicing web rolls, involves damage to the type and blankets when the two webs that have been spliced together pass through the printing couple. This invention is designed to obviate this difficulty.

The invention is illustrated as applied to a well known type of printing press, a well known web supply device, and a splicing device also of a well known character.

In the form shown, columns 1 form a support for end brackets 2 which in turn support a shaft 3. On this shaft are mounted spiders 4 constituting a reel for rotatably supporting a running roll R and a spare roll S. A motor 6 mounted on one of the end brackets 2 is provided with a worm 7 to operate a worm wheel 8 connected with the spiders 4 by the shaft 3 for rotating the reel.

A bracket 9 attached to the bed plate 10 provides a pivotal support for a brush frame 11. This brush frame, as usual, carries a solenoid 12 which operates a brush or brushes 13 to press the running web W against the spare roll S at the proper time. A plunger 14 for the solenoid is shown connected with a link 15, the other end of which is pivotally connected to an arm 16 carried on a brush arm shaft 17. A series of brush arms 18 support the brushes 13. A spring 19, operating through a collar 20 connected with the link 15, tends to keep the brushes in the position shown in Fig. 1. As is well known, the energizing of the solenoid 12 causes the plunger 14 to be lifted, overcoming the resistance of the spring 19, and thus rotating the shaft 17 in a clockwise direction to press the web W against the spare roll S. This mechanism is used to effect a splicing from the running web to the spare roll. A knife 21 is shown diagrammatically. It will be understood that it is pivotally mounted on the brush frame 11 for severing the web W after the splicing operation is completed.

All the mechanism described above is well known in this art. The solenoid 12 is energized through a contact 52 and push button 53.

The splicing operation, of course, necessitates the passing of the following end of the running web W and the leading end of the new web from the spare roll S together through the printing couple.

Means is provided, according to this invention, for releasing the squeeze or pressure between the cylinders of the two printing couples during the time when the two webs are passing through so that no damage will be done.

A printing unit is shown comprising two impression cylinders 22 and 23 cooperating with two plate cylinders 24 and 25 respectively. These plate cylinders are supplied with ink from ink motions 26 and 27 in any well known way. The impression cylinders 22 and 23 are mounted in double eccentric bearings 28 and 29 respectively. The bearings are provided with regulating worms 30 and 31 respectively operating worm wheels for setting the normal impression. Each worm is provided with a circumferential series of holes through which they can be adjusted by a screw driver or other simple tool by hand. The outer members of the bearings 28 and 29 carry overlapping radial circular projections 32 and 33 respectively which are spaced apart and normally registering with each other. The projections are partially enclosed by opposite projections 35 on a throwout rod 34. When the projections 35 are raised or lowered, the two eccentric bearings 28 and 29 will turn through the projections 32 and 33 to move the impression cylinders 22 and 23 slightly away from the plate cylinders 24 and 25, thus interrupting the impression.

The bottom end of the rod 34 is yoke shaped to fit over a shaft 36. The bottom end of the rod 34 carries a cam roll 37. The roll 37 cooperates with the path of the closed cam 38 and is rotated by a shaft 47 on which the cam is fixed. The lower end of the rod 34 is located along the shaft 36 by a collar 54. A bracket 55 guides the top end of the rod 34.

On the end of one impression cylinder 23 is a gear 40 rotating, of course, with the cylinder. This is a bevel gear meshing with a bevel gear 41 on a shaft 42 mounted on suitable brackets 43. On the other end of this shaft 42 is a worm 45 which meshes with a helical gear 46 on said shaft 47. On the end of this shaft 47 is a steel disc 39 which constitutes a part of a magnetic clutch 48. Thus, any rotation of the printing couple, including the impression cylinder 23, will rotate the bevel gear 40 and therefore the disc 39 of the magnetic clutch. The magnetic clutch 48 is secured to the shaft 36 and may be energized through wires 49 and suitable collector rings, not shown, to rotate the cam 38. The path of the cam 38 shown in Fig. 1 is such that a single rotation of this cam will move the rod 34 vertically and turn the two eccentrics 28 and 29 through their projections 32 and 33 to release the impression on the two printing couples while a definite length of paper passes through them. The impression is reset to the original amount at the end of that time. A projection 50 is carried by the cam 38 for operating the roller of a switch 51.

It will be noted that the shaft 36 extends across the press and carries a second cam similar to the cam 38 and an entire duplicate equipment so that the impression is released at both ends of the printing couple simultaneously.

When the solenoid 12 is energized to pull up the plunger and effect a splice between the running web and the spare roll S a relay device is used to energize the magnet clutch 48. Since the steel disc 39 is rotating, the frictional contact between that disc and the magnetic clutch 48, of course, causes the shaft 36 to turn. When the contact is made in the switch 51, it serves to continue to hold the magnetic clutch 48 until such time as the cam 38 has made one complete revolution and opened the contacts in the switch 51. This deenergizes the magnetic clutch 48. This causes the rotation of the shaft 36 to stop. At this time the splice will have passed through both printing couples while the impression is relieved. The papers printed during this period have to be thrown away in any case.

In case the web splicing arrangement is at a considerable distance from the printing unit a delay device is put between the splicing mechanism and the impression relieving mechanism so that the relief can be obtained at a suitable time after the splice is made to enable the spliced part of the web to pass from one point to the other. This can be accomplished by placing on the upper end of the shaft 42 a disc 56, a collar 57, and a spring 58 which bears against a drum 59. The drum 59 is rotatably mounted on the shaft 42 and tends to rotate due to the friction between the disc 56 and drum 59. A projection 60 carried on the drum 59 is engaged by a toe 61 to prevent the rotation of the drum 59 until such time as a solenoid 62 is energized. By inspecting the wiring diagram in Fig. 4 it is evident that, when contact is made in push button 53 through the contacts 52 on the fresh roll spindle, the brush solenoid 12 will be energized to effect a splice. Since the solenoid 62 is connected in parallel with the brush solenoid 12 it becomes energized and withdraws the toe 61 from the projection 60, permitting the drum 59 to rotate proportionately to the speed of the press. A projection 63 also carried on the drum 59 engages a switch 64 to close the contacts therein.

By tracing out the wiring it will be seen that the magnetic clutch 48 becomes energized and relieves the impression on the two printing couples as above described. The moment that the magnetic clutch 48 becomes energized so that the cam 38 begins rotation, the contacts in the switch 51 are closed and keep the magnetic clutch 48 energized, even though the contacts in the switch 64 are open, until the cam 38 has made one complete revolution. At that time the contacts in the switch 51 are opened and the magnetic clutch 48 is deenergized. It is also evident that the opening of the contacts in the push button 53 prevents any further energization of the solenoid 62 which allows the toe 61 to re-engage the projection 60 after one revolution of the drum 59.

It is to be understood, of course, that the embodiments of the invention as hereinbefore described and disclosed in the drawings is intended as illustrative rather than as limiting, and that the invention is capable of use with other similar and analogous structures. For example, instead of being applied to a printing couple, it is adaptable with equal facility to any stack of cylinders used in combination with a web splicing device, where it is desirable and necessary to release the pressure or squeeze of one cylinder on the other, during the time the double thickness of web created by the splice is passing between the cylinders, in order that no damage may be done.

Having thus described my invention and the advantages thereof, I do not wish to be limited to the details herein disclosed, otherwise than as set forth in the claims, but what I claim is:

1. The combination with a printing couple, of means for making a web splice, means for releasing the impression between the cylinders of the couple, and means cooperating with the splicing means for automatically operating the releasing means when a splice is made.

2. The combination with a printing couple and a splicing device, of means cooperating with the splicing device for releasing the impression between the cylinders of the couple.

3. The combination with a printing couple, of means for releasing the impression between the cylinders of the couple, a splicing device, and means operated in conjunction with the splicing device for setting the releasing means into operation.

4. The combination with a printing couple, of a web supply device, a splicing device, means for starting the splicing device into operation, means for releasing the impression between the cylinders of the printing couple, and means operated by the said starting means for initiating the action of the releasing means.

5. The combination with a printing press comprising two printing couples, of a shaft, means operated by one cylinder of one of said couples for turning said shaft, a second shaft, a magnetic clutch for connecting the first shaft to cause the second shaft to turn, a cam on the second shaft, and means operated by the cam for releasing the impression between both printing couples.

6. The combination with a printing couple and means for releasing the impression between the cylinders thereof, of a shaft constantly operated by the impression cylinder of said couple, a second shaft, means operated by the second shaft for operating said releasing means, and a clutch for connecting the two shafts together.

7. The combination with a printing couple and means for releasing the impression between the cylinders thereof, of a shaft constantly operated by the impression of said couple, a second shaft, means operated by the second shaft for operating said releasing means, a magnetic clutch for connecting the two shafts together, a splicing mechanism, and means for simultaneously energizing said clutch and starting the splicing mechanism into operation.

8. In a printing machine, the combination of a printing couple, a shaft constantly operated by one of the cylinders of said couple, a second shaft, a magnetic clutch connecting the two shafts to operate the second shaft, a cam on the second shaft, a movable rod, said cam being connected to move the rod, means operated by the rod for releasing the impression between the cylinders of said couple, and means whereby, at the end of the complete rotation of said cam, the cylinders will be reset to restore the impression to its original condition.

9. In a perfecting printing press, the combination of two printing couples, a shaft, means connected with a cylinder of one printing couple for rotating said shaft when said cylinder rotates, a second shaft, means for connecting the two shafts to rotate the second shaft with the first one, a cam on the second shaft, a reciprocable rod having a yoke and a roller cooperating with said cam to reciprocate the rod, said cylinder and the corresponding cylinder of the other couple having eccentric bearings, means on the rod for turning the eccentric bearings when the rod is reciprocated by the cam in one direction for turning the two cylinders away from their companion cylinders and releasing the impressions.

10. In a printing machine, the combination of a splicing device comprising a solenoid, printing couples, a shaft connected with the printing couples to be rotated thereby, a second shaft, a magnetic clutch for connecting said shafts together, means whereby, when the solenoid is energized, the magnetic clutch also will be energized, and means connected with the second shaft for releasing the impression between the cylinders of said couples, whereby the double web caused by splicing, when passing through the printing couple, will be relieved of pressure, for the purpose described.

11. The combination with a printing couple, of means for releasing the impression between the cylinders of the couple, a splicing device, and means operated in conjunction with the splicing device for setting the releasing means into operation at a predetermined time after the splicing device acts to produce a splice.

12. In a printing machine, the combination of a printing couple, a cam operated by one of the cylinders of the printing couple, a movable rod, said cam being connected to move the rod, means operated by the rod for releasing the impression between the cylinders of said couple, and means whereby, at the end of the complete rotation of said cam, the cylinders will be reset to restore the impression to its original condition.

13. In a printing machine, the combination of a printing couple, a splicing device, means for releasing impression on the printing couple, means for making a splice, and automatic means for delaying release of the impression until just prior to the passage of the splice through the printing couple.

14. In a printing machine, the combination of a printing couple, a splicing device, means for releasing impression on the printing couple, means for making a splice between webs, and automatic means for releasing the impression just before the spliced webs pass through the printing couple and restoring the impression just after the spliced webs have passed through the printing couple.

15. The combination with a web treating machine and a splicing device, of means cooperating with the splicing device for releasing the squeeze on the web in the web treating machine.

16. The combination with a web treating machine including a plurality of cylinders, and a splicing device, of means for making a web splice, means for releasing the pressure between the cylinders of the web treating machine, and means cooperating with the splicing means for automatically operating the releasing means when a splice is made.

17. The combination with a plurality of cylinders for acting on a web through which the web is caused to pass, of a splicing device, of means for releasing the pressure between said cylinders after a splice is made, and means operated in conjunction with the splicing device for setting the releasing means into operation.

18. The combination with a plurality of cylinders for acting on a web through which the web is caused to pass, of a splicing device, means for releasing the pressure on these cylinders, means for making a splice between webs, and automatic means for releasing the pressure just before the spliced webs pass between cylinders and restoring the pressure just after the spliced portion of the webs has passed between the cylinders.

ISIDOR TORNBERG.